(12) United States Patent
Neirynck

(10) Patent No.: US 10,782,860 B2
(45) Date of Patent: Sep. 22, 2020

(54) SYSTEMS AND METHODS FOR DYNAMIC SCALING IN GRAPHICAL USER INTERFACES

(71) Applicant: Elasticsearch B.V., Mountain View, CA (US)

(72) Inventor: Thomas Raphaël Gentiel Neirynck, Louisville, KY (US)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 16/286,328

(22) Filed: Feb. 26, 2019

(65) Prior Publication Data

US 2020/0272307 A1 Aug. 27, 2020

(51) Int. Cl.
*G06F 3/0484* (2013.01)
*G06F 3/0481* (2013.01)
*G06F 3/0482* (2013.01)

(52) U.S. Cl.
CPC ........ *G06F 3/04845* (2013.01); *G06F 3/0482* (2013.01); *G06F 3/04817* (2013.01)

(58) Field of Classification Search
CPC .................................................. G06F 3/04845
USPC ......................................................... 715/788
See application file for complete search history.

(56) References Cited

U.S. PATENT DOCUMENTS

| | | | |
|---|---|---|---|
| 8,683,490 B2 * | 3/2014 | Endrikhovski | G06F 3/04847 715/771 |
| 10,109,086 B1 * | 10/2018 | Bakshi | G06T 13/80 |
| 2005/0216865 A1 * | 9/2005 | Rollin | G06F 3/0482 715/839 |
| 2007/0226204 A1 | 9/2007 | Feldman | |
| 2008/0120565 A1 * | 5/2008 | Stiso | G06F 3/04847 715/771 |
| 2013/0127877 A1 * | 5/2013 | Blas, Jr. | G06T 13/00 345/474 |
| 2013/0254699 A1 | 9/2013 | Bashir et al. | |
| 2013/0346367 A1 | 12/2013 | Trugman et al. | |
| 2014/0082093 A1 | 3/2014 | Savage | |
| 2014/0125672 A1 * | 5/2014 | Winternitz | G06F 8/38 345/440 |
| 2014/0181222 A1 | 6/2014 | Geris et al. | |

(Continued)

OTHER PUBLICATIONS

Grand, Adriend, "Document-Level Attribute-Based Access Control," U.S. Appl. No. 16/212,475, filed Dec. 6, 2018, Specification, Claims, Abstract, and Drawings, 37 pages.

(Continued)

*Primary Examiner* — William D Titcomb
(74) *Attorney, Agent, or Firm* — Carr & Ferrell LLP

(57) ABSTRACT

Systems and methods for dynamic scaling in graphical user interfaces are described herein. According to some embodiments, an example method includes receiving input data to be graphically displayed on a graphical user interface, generating an interface that includes a control icon that can be translated within a grid so as to define an easing curve and to select at least two easing function parameters for a parameterizable easing function, and generating, in real-time as the least two easing function parameters are received, the graphical user interface which includes output representations of the input data which have one or more styling parameters that are selected based on the parameterizable easing function such that monotonicity is maintained between the input data and the output representations.

19 Claims, 9 Drawing Sheets

(56) References Cited

U.S. PATENT DOCUMENTS

| | | | |
|---|---|---|---|
| 2014/0215443 A1 | 7/2014 | Voccio et al. | |
| 2014/0365511 A1 | 12/2014 | Burrows et al. | |
| 2014/0380237 A1* | 12/2014 | Kroupa | G06F 3/0483 |
| | | | 715/803 |
| 2015/0009234 A1 | 1/2015 | Johnson et al. | |
| 2015/0070351 A1* | 3/2015 | Tarquini | G06T 13/40 |
| | | | 345/419 |
| 2015/0127637 A1* | 5/2015 | Cavanagh | G06F 16/24578 |
| | | | 707/723 |
| 2015/0220594 A1 | 8/2015 | Leyba | |
| 2015/0269499 A1 | 9/2015 | B et al. | |
| 2015/0363733 A1 | 12/2015 | Brown | |
| 2015/0370839 A1 | 12/2015 | Bareket et al. | |
| 2016/0011751 A1* | 1/2016 | Moses | G06F 3/0482 |
| | | | 715/769 |
| 2016/0182328 A1 | 6/2016 | Bhasin et al. | |
| 2016/0188663 A1* | 6/2016 | Tsumura | G06F 16/2462 |
| | | | 715/771 |
| 2016/0283085 A1 | 9/2016 | Beausoleil et al. | |
| 2017/0075919 A1 | 3/2017 | Bose et al. | |
| 2017/0169611 A1 | 6/2017 | Ramirez Flores et al. | |
| 2017/0346862 A1 | 11/2017 | Hanhirova | |
| 2018/0062955 A1 | 3/2018 | Broda et al. | |
| 2018/0113891 A1 | 4/2018 | Jaskiewicz et al. | |
| 2018/0121082 A1* | 5/2018 | Zhu | G06F 3/04886 |
| 2018/0150384 A1 | 5/2018 | Alaranta et al. | |
| 2018/0232194 A1* | 8/2018 | Chen | G06F 3/012 |
| 2018/0239658 A1 | 8/2018 | Whitner et al. | |
| 2018/0270122 A1 | 9/2018 | Brown et al. | |
| 2018/0276266 A1 | 9/2018 | Diwakar | |
| 2018/0287856 A1 | 10/2018 | Whitner et al. | |
| 2019/0057534 A1* | 2/2019 | Henry | G06T 13/00 |
| 2019/0138995 A1 | 5/2019 | Currin et al. | |
| 2019/0272085 A1 | 9/2019 | Radhakrishnan Lakshmi | |
| 2019/0317754 A1 | 10/2019 | Mosquera et al. | |
| 2020/0021505 A1 | 1/2020 | Vinnakota et al. | |
| 2020/0202020 A1 | 6/2020 | Ewing | |

OTHER PUBLICATIONS

Ewing, Courtney, "Methods and Systems for Access Controlled Spaces for Data Analytics and Visualization," U.S. Appl. No. 16/226,138, filed Dec. 19, 2018, Specification, Claims, Abstract, and Drawings, 47 pages.

Willnauer, Simon Daniel, "Default Password Removal," U.S. Appl. No. 16/047,959, filed Jul. 27, 2018, Specification, Claims, Abstract, and Drawings, 37 pages.

Seifermann, Valentin, "Application Performance Monitoring in Microservice-Based Systems," Institute of Software Technology—Reliable Software Systems, University of Stuttgart, 2017; 85 pages.

* cited by examiner

SYSTEMS AND METHODS FOR DYNAMIC SCALING IN GRAPHICAL USER INTERFACES

CROSS REFERENCE(S) TO RELATED APPLICATION(S)

N/A

FIELD OF THE PRESENT TECHNOLOGY

The present technology relates generally to systems and methods that provide for dynamic scaling in graphical user interfaces. Some embodiments allow for use of configurable easing functions and multi-layer synchronization alone or in combination with one another.

SUMMARY OF THE PRESENT TECHNOLOGY

According to some embodiments, the present technology may be directed to a method comprising receiving input data to be graphically displayed on a graphical user interface; generating an interface comprising a control icon that can be translated within a grid so as to define an easing curve and to select at least two easing function parameters for a parameterizable easing function; and generating, in real-time as the least two easing function parameters are received, the graphical user interface which comprises output representations of the input data which have one or more styling parameters that are selected based on the parameterizable easing function such that monotonicity is maintained between the input data and the output representations.

According to other embodiments, the present technology may be directed to a system comprising a processor; and a memory, the processor executing instructions stored in the memory to: receive input data to be graphically displayed on a graphical user interface; generate an interface comprising a control icon that can be translated within a grid so as to define an easing curve and to select at least two easing function parameters for a parameterizable easing function; configure the parameterizable easing function using the inputs for the at least two easing function parameters; and a display device that provides, in real-time as the least two easing function parameters are received, the graphical user interface which comprises output representations of the input data which have a visual appearance that is selected based on the parameterizable easing function such that monotonicity is maintained between the input data and the output representations, the visual appearance comprising at least one of hue or size.

According to additional embodiments, the present technology may be directed to method comprising receiving input data for a map having a plurality of layers that are to be graphically displayed on a graphical user interface; generating an interface comprising a control icon that can be translated within a grid so as to define the easing curve and to select at least two easing function parameters for a parameterizable easing function; automatically configuring the parameterizable easing function using the inputs for the at least two easing function parameters; automatically detecting a common metric between a portion of the input data across each of the plurality of layers; automatically synchronizing one or more styling parameters for the output representations of the portion of the input data on each of the plurality of layers such that the one or more styling parameters for the output representations are identical to one another; and generating, in real-time as the least two easing function parameters are received, the map that comprises at least the output representations of the portion of the input data.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
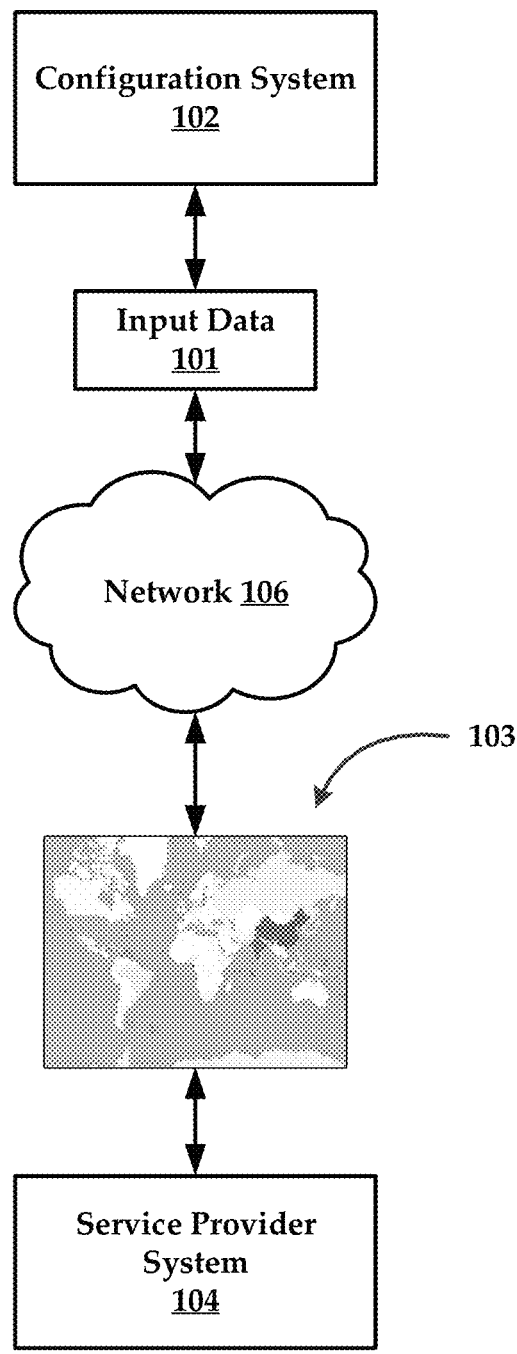
FIG. 1 illustrates an exemplary architecture for practicing aspects of the present disclosure.

For context, in data-visualization, easing functions are used to map input data to an output while preserving monotonicity from the input to output domain. Some data-visualizations are generally used to either mute differences in a data-distribution of the input data at a top-end, or exaggerate differences in the input data. Log-scaling of input data can be used in the former case, while squaring of input data can be used to exaggerate differences in the input data.

When applied to ordinal values, this scaling generally drives some symbology. For example, a size of a feature (height of a bar-chart, area of a circle-marker, and so forth), or a color from a color-ramp could be driven by ordinal values. This scaling is generally applied after use of an easy-function to produce a correct visual effect.

Allowing a user to merely select from log or exponential/squaring easing functions may cause users to have trouble in understanding what an easing function does, without providing the user with some immediate visual feedback. Also, there are often mathematical limitations inherent in the use of easing functions. For example, most easing functions do not preserve a range from the input and output domain, while others may return undefined results for negative values or values below a threshold. That is, the input and output domain of the easing function are ]0,1[, which simplifies post-hoc scaling (e.g., log-scaling and squaring/ exponential skew the output domain (and as noted herein, can return undefined values).

Generally speaking, the present disclosure is directed to systems and methods that provide for dynamic scaling in graphical user interfaces. Generally, the systems and methods herein are configured to receive input data and convert the input data into output representations that can be represented on a visual display such as a map. The methods for converting the input data into output representations include the use of parameterizable easing functions that are user-configurable. In some embodiments, the systems and methods herein are configured to provide user-directed easing function parameter configuration though a manipulatable interface. The parameterizable easing functions selectively modify styling parameters for output representations on visual objects such as maps and the like. In one example, the output representations include states or countries on a map. Other embodiments could include the output representations including wedges of a pie chart, bars in a bar graph, icons on map, and so forth. Other example use cases would apparent to one of ordinary skill in the art with the present disclosure before them.

The styling parameters are used to selectively alter an aspect of visual appearance of the output representations such as color (hue), size, outline thickness, and so forth—just to name few. In some embodiments, the styling parameters that are selected are based on the parameterizable easing function which preserves monotonicity between input data and the output representations.

Some visual representations can include a plurality of layers. The input data can be displayed as output representations on each of the plurality of layers. In some embodiments, there is correspondence or similarity of a metric of the input data across these pluralities of layers. In these instances, the systems and methods disclosed herein provide for synchronizing of styling parameters on various layers of where input data share a similar or identical metric. These and other advantages of the present disclosure are provided herein in greater detail.

FIG. 1 is a schematic view of an example architecture for practicing aspects of the present disclosure. In some embodiments, the architecture includes a configuration system 102, a service provider system 104, and a network 106. In general, the configuration system 102 includes any suitable user computing system or device such as a laptop, a desktop computer, a tablet, or a smartphone—just to name a few. The configuration system 102 allows a user to receive the graphical user interfaces of the present disclosure and utilize interfaces provided thereon to manipulate parameters of parameterizable easing functions. Additional details on these features are provided in greater detail herein. The network 106 can include any suitable public or private network, which can either wired, wireless, or combinations thereof. While some embodiments envision a server-client type relationship between the configuration system 102 and the service provider system 104, the methods disclosed herein can also be executed on a single, specifically configured computing device.

According to some embodiment, the service provider system 104 is configured to provide various features including, but not limited to, visual representations such as graphs and maps. The service provider system 104 also provides various graphical user interfaces, such as those configured to display a visual representation long with an interface that allows a user of the configuration system 102 to manipulate the parameters of a parameterizable easing function. As the user manipulates the interface, corresponding changes are made to the parameters of the parameterizable easing function, which result in changes to the visual representation. As noted above, this can include selective adjustment to styling parameters of output representations provided on the visual representation. That is, the service provider system 104 generates the graphical user interfaces in real-time, which includes making real-time or near-real-time adjustments to styling parameters of output representations.

In more detail, the configuration system 102 receives input data 101 that is to be graphically displayed on a graphical user interface. For example, the input data may include inbound server traffic data. The user may wish to visualize a volume of inbound server traffic from each country provided on a map 103. In order to provide the map where the countries are visually depicted as desired by the user, the service provider system 104 implements a parameterizable easing function and applies the same to the input data. In some embodiments, parameters of the parameterizable easing function are provided based on use of an interface generated by the service provider system 104.

Figure 2:
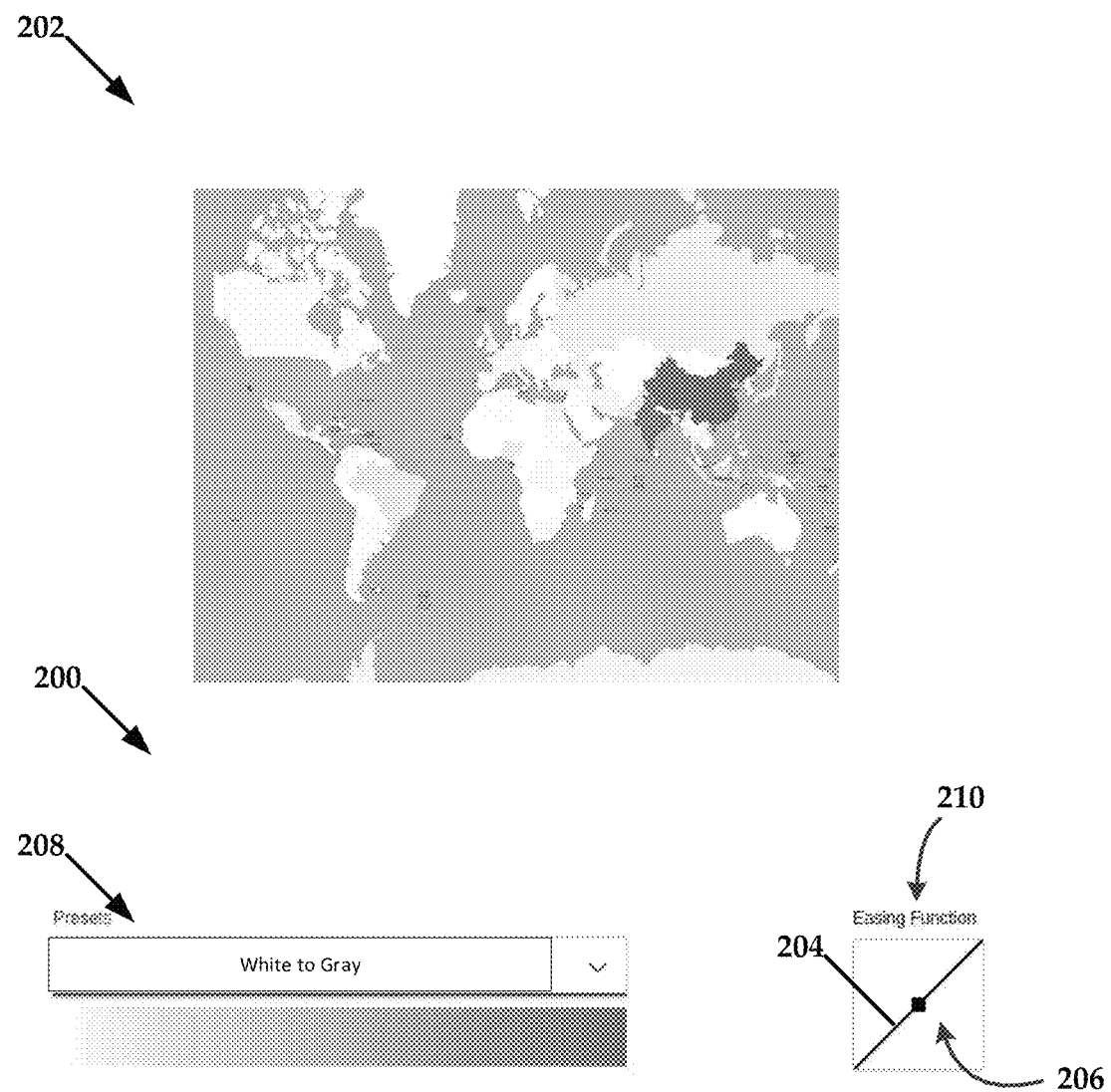
FIG. 2 is a graphical user interface that includes a map and interface that can be used to select aspects of a parameterizable easing function using a linear easing curve.

FIG. 2 illustrates an example interface 200 and corresponding map 202. In some embodiments, interface 200 comprises an easing curve 204 and a control icon 206. The easing curve 204 of FIG. 2 is a linear easing curve. In general, the linear scaling function is an easing function providing a straight line and comprises an input that matches exactly an output.

Other example easing curves are illustrated in other embodiments and figures referenced infra. In some embodiments, the parameterizable easing function includes:

$$f(x) = x^{\frac{\log b}{\log a}}$$

where ∃ x in [0, 1]; ∃ a,b in ]0, 1[; f(0)=0; f(1)=1; ∃ a=b<=>f(x)=x.

In general, the parameterizable easing function has two parameters a and b. Based on their values, the parameterizable easing function takes a linear, convex or concave shape. In some embodiments, as illustrated in FIG. 2, the easing curve 204 can comprise a linear shape. In some embodiments, an X-Y chart 208 is populated with the easing curve 204 and the control icon 206.

The control icon 206 can be translated anywhere within the grid to configure the two easing parameters of the at least two easing function parameters (a, b) for the parameterizable easing function. The line of the easing function, or easing curve 204 illustrated, provides visual feedback for the user. In some embodiments, the aforementioned parameters are further controlled such that when x=a, then f(x)=b. Thus, the line of the easing function (e.g., easing curve 204) passes through the control point (control icon 206). The position of the control icon 206 dictates, at least in part, the shape of the easing function line.

The user of the configuration system 102 can use the control icon 206 to select a position along the easing curve 204. In some embodiments, a position of the control icon 206 on the X-axis of the interface 200 represents a value of the a parameter, and a position of the control icon 206 on the Y-axis of the interface 200 represents a value of the b parameter. A control function of the service provider system 104 renders a shape of the parameterizable easing function in real time providing immediate visual feedback to the user. In various embodiments the service provider system 104 is configured to apply smoothing immediately on the symbology of the map (or other underlying visual representation), either updating a color-ramp or the size of a symbol on the map.

Figure 3:
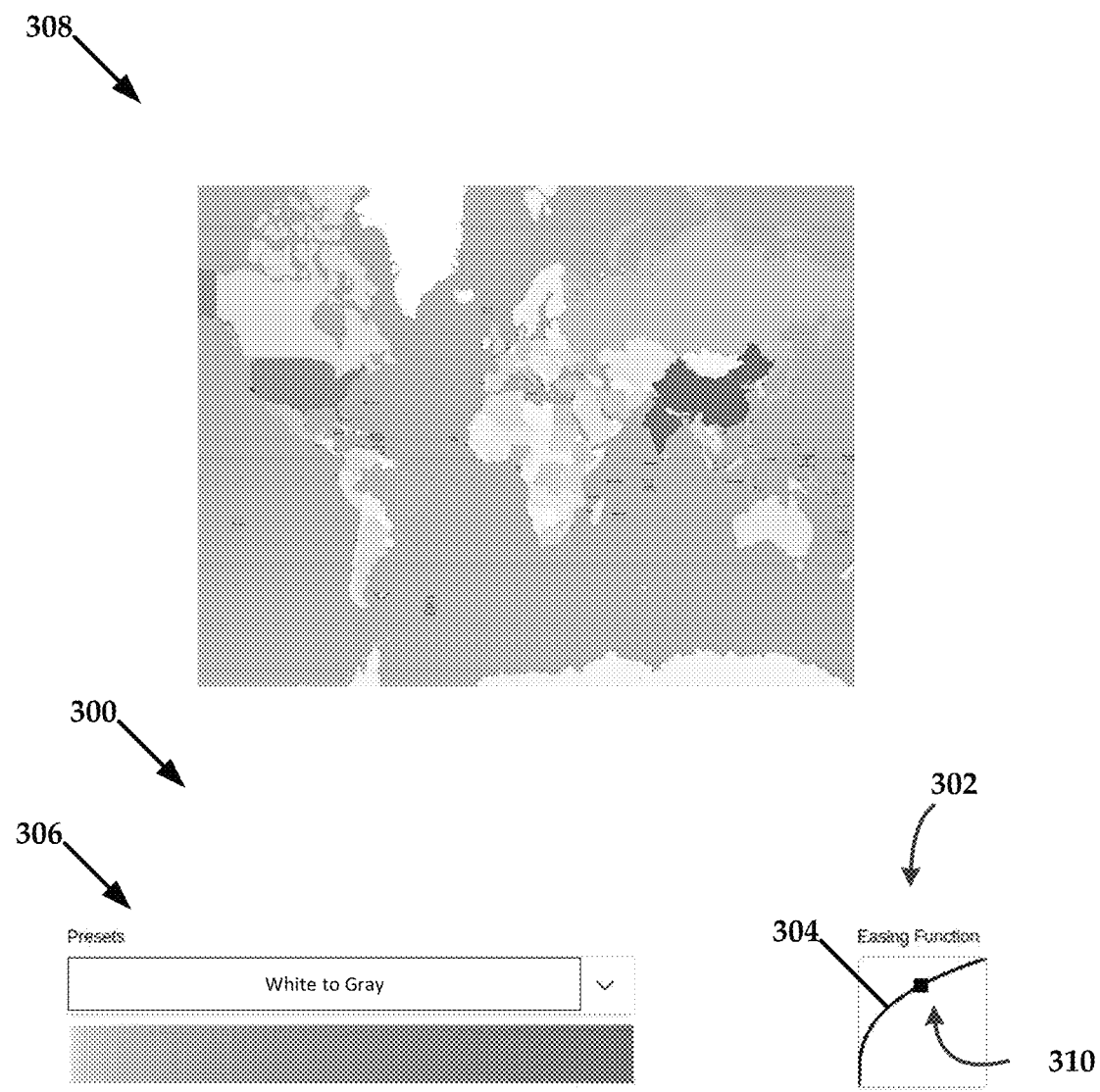
FIG. 3 is a graphical user interface that includes a map and interface that can be used to select aspects of a parameterizable easing function using a concave easing curve.

In some embodiments, when the value of the b parameter is less than a value of the a parameter, the easing curve 204 for the parameterizable easing function is convex in shape (see FIG. 3). When the value of the b parameter is greater than a value of the a parameter, the easing curve 204 for the parameterizable easing function is concave in shape (see FIG. 4).

In addition to the easing curve 204 and control icon 206, the interface 200 comprises a scaling preview 210 of the scaling between the a and b parameters, which in this example are provided with reference to a color-ramp. Again, the x-axis corresponds to the a parameter, while the y-axis corresponds to the b parameter. The user drags the control icon 206 to different locations in the X-Y chart 208 which changes the values for the a and b parameters and thus the shape of the easing curve 204. A corresponding real-time effect is effectuated on the color-ramp of the scaling preview 210, and the map 202 is shown immediately to the user in an updated format in accordance with the user's manipulation of the interface 200. Specifically, in this example, the easing curve 204 provides linear scaling between white (a parameter) and gray (b parameter).

In sum, the service provider system 104 (FIG. 1) is configured to generate, in real-time as the least two easing function parameters are received (through manipulation of the control icon 206 on the interface 200) the graphical user interface. Again, the graphical user interface comprises output representations of the input data which have one or more styling parameters that are selected based on the parameterizable easing function such that monotonicity is maintained between the input data and the output representations. Specifically, the output representations have one or more styling parameters, such as color blending from white-to-gray based on a use of the interface 200.

In this example, the map 202 includes output representations in the shape of countries. Styling parameters such as coloring of the output representations are controlled using the interface 200. The input data underlying the coloring of the output representations includes inbound server traffic volume in this example. To be sure, these are merely examples of input data, output representations, and styling parameters that can be provided through use of the systems and methods disclosed herein and are not intended to be limiting to any specific use case.

FIG. 3 illustrates another example interface 300 that includes an X-Y chart 302 that comprises an easing curve 304 that represents concave scaling. A control icon 310 is also present. The concave scaling of the a and b parameters for the parameterizable easing function enables muting of outliers on a top-end of the input data. Stated otherwise, when this kind of scaling is selected, the easing curve is concave in shape and causes a muting of outliers of the input data that are represented on a top-end of the data distribution. Stated otherwise, this functionality causes an exaggeration of the difference in values of the input data that are represented on the low-end of the distribution (which correspondingly will result in emphasizing low-end parts of the input data). The concave scaling is similar to logarithmic scaling. A corresponding shift in a preview color-ramp (scaling preview 306 more gray than white) is illustrated and reflected in a comparison between a map 308 with map 202 of FIG. 2. In sum, a concave easing function allows for muting of outliers at a top-end of the data distribution. Users may desire to use this easing function when they do not care about the outliers in the data (e.g., outliers "blend in" visually).

Figure 4:
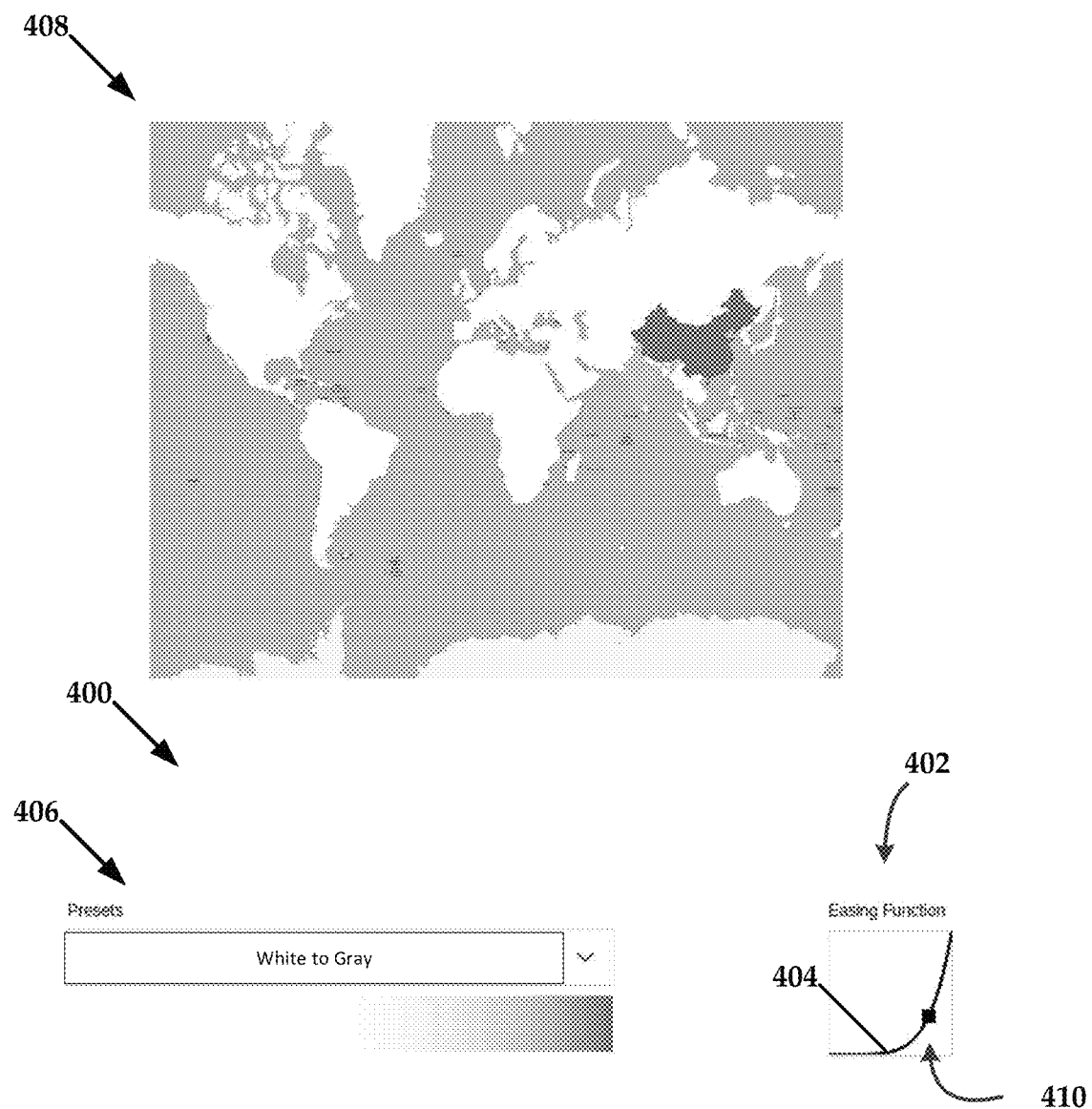
FIG. 4 is a graphical user interface that includes a map and interface that can be used to select aspects of a parameterizable easing function using a convex easing curve.

FIG. 4 illustrates another example interface 400 that includes an X-Y chart 402 that comprises an easing curve 404 that represents convex scaling. A control icon 410 is also present. The convex scaling of the a and b parameters for the parameterizable easing function enables muting of outliers on a low-end of the input data (which correspondingly will result in emphasizing high-end parts of the input data). When the exponential/squaring scaling is selected, the easing curve is convex in shape and causes a corresponding muting of outliers of the input data that are represented on a low-end) of the easing curve. The convex scaling is similar to exponential/squaring scaling. A corresponding shift in a preview color-ramp (scaling preview 406 more white than gray) is illustrated and reflected in a comparison between a map 408 with map 202 of FIG. 2. In sum, a position of position of control point (control icon 410) in the X-Y chart 402, where X-coordinate>Y-coordinate designates a convex easing function that exaggerates differences in the input data at the top-end of the distribution. Generally, users use this easing function when they want to identify outliers (e.g., outliers "jump out" visually).

In general, the service provider system 104 can automatically select an easing function type based on the inputs for the at least two easing function parameters. That is, the service provider system 104 can select from any of linear scaling, log scaling, or exponential/squaring t scaling based on the selections made by the user.

Figure 5:
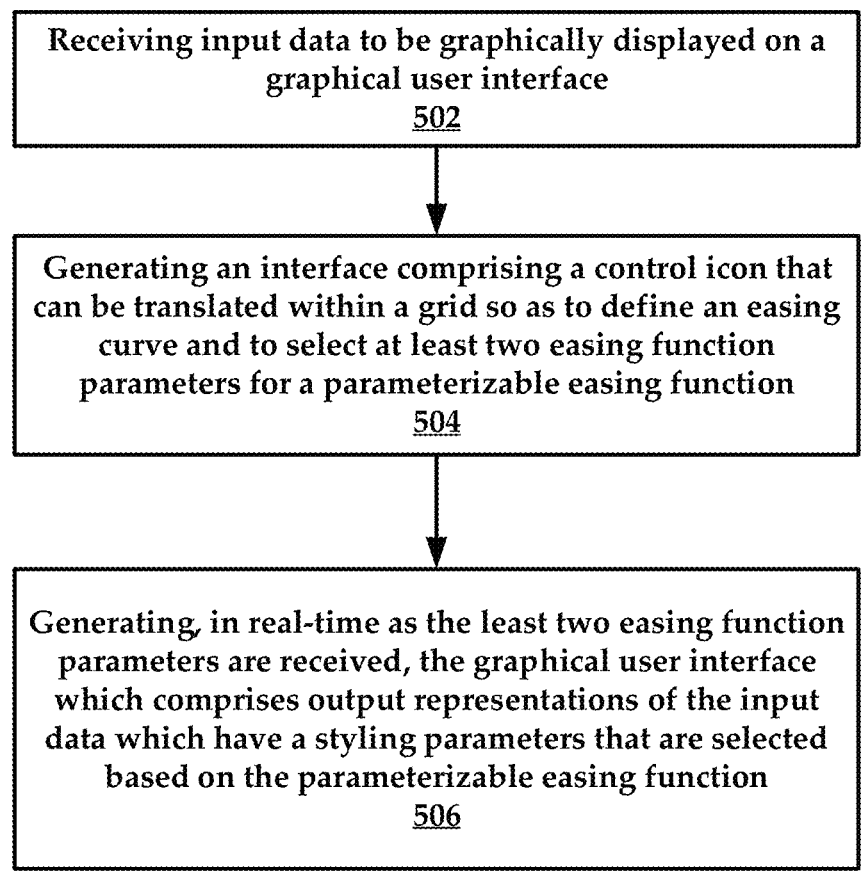
FIG. 5 is a flowchart of an example method of the present disclosure.

FIG. 5 is a flowchart of an example method that can be executed in accordance with the present disclosure. The method includes a step 502 of receiving input data to be graphically displayed on a graphical user interface. The method also includes a step 504 of generating an interface comprising an easing curve and a control icon that can be translated within a grid so as to define the easing curve to select at least two easing function parameters for a parameterizable easing function. The method can also include a step 506 of generating, in real-time as the least two easing function parameters are received, the graphical user interface which comprises output representations of the input data which have a styling parameters that are selected based on the parameterizable easing function. To be sure monotonicity is maintained between the input data and the output representations.

In addition to the parameterizable scaling feature disclosed above, the systems and methods disclosed herein are also configurable to allow for synchronization between a plurality of layers of a visual representation. For example, a map can be comprised of a plurality of layers that each comprises input data. In one non-limiting use case a map can comprise two or more layers where each layer provides a level or granularity with respect to the input data used for a map. For example, a first layer can include country level data and a second layer can include state level data. To be sure, input data can be synchronized for more layers than two, but to avoid obscuring the salient features of the present disclosure examples including these two layers will be provided. In some embodiments, the input data is received from a plurality of sources. In other embodiments, the input data is received from a single source but various levels of granularity are included.

For context, when creating a map (or other graphical representation of data), users often desire to create a single map with a single topic, but in some instances the underlying input data is provided by multiple sources or is provided on a different levels of granularity.

In one example use case, a user wants to make a choropleth map that shows a number of visitors to a website by administrative subdivision of country. This single map would allow users to compare the number of website visitors between Canada provinces or United States, as an example. When the user does not have boundary data for administrative subdivisions for certain countries, the user may just want to allow for illustration of server-traffic by country instead. In these instances, the user could create a new data layer, which is the union of all layers, minus all the features that overlap. The user would also have to create a new composite primary key for this layer, which will allow joining of the visitor counts to these multiple administrative divisions. This process is unduly time-consuming to be sure. Alternatively, the user can continue to use multiple layers, but ensure that all styling parameters are manually configured. For example, the color-ramp must be configured using the same domain for all layers. In practice, this means that adding a new layer will always require reconfiguring the styling of all the layers.

Rather than using these options, the service provider system 104 can be configured to automatically detect when a same metric is being symbolized by a same visual property (e.g. fill-color) in different layers. When this similarly is detected, the service provider system 104 can automatically synchronize the styling parameters for all layers. This provides a technical solution that prevents users from making incorrect visual comparison between features. These features also prevent the user from having to perform an offline data curation step of creating a new layer which is the union of all these layers. These features also guard users from creating maps with mismatching symbologies and therefore inadvertently confusing or misleading their audience.

In some embodiments, the service provider system 104 is configured to identify any of the plurality of layers where an identical metric is driving the same property. For example, a metric could include inbound server traffic volume. This metric could be provided in the input data in terms of state (or province) level values or country level values.

The service provider system 104 uses field mappings of a search index (a search engine query for inbound server traffic volume to a particular Internet Protocol (IP) address for example) and any associated configured aggregations to determine equality of metrics. In some embodiments, the configured aggregations can be determined using metadata of the input data.

Synchronization may occur by the service provider system 104 if identical metrics drive styling parameters in multiple layers. The service provider system 104 may choose not synchronize the input data of multiple layers if identical metrics drive different symbologies. For example, if symbologies (e.g., stylistic parameters such as color, shape, size, and so forth) of one layer include fill-in color, but a second layer includes outline-color. Thus, the service provider system 104 can detect a discrepancy between symbologies of the input data (across a plurality of layers). The styling parameters for the output representations of the input data are not automatically synchronized in these instances.

In some embodiments, when a map (or other visual representation) is comprised of a plurality of layers that each comprise parts of the input data, the service provider system 104 is configured to automatically detect a common metric between the input data of the plurality of layers. The service provider system 104 can also automatically synchronize the styling parameters for the output representations of the input data on each of the plurality of layers such that the styling parameters for the output representations are identical to one another. Additional details on these processes are provided below with reference to FIGS. 6-8.

In more detail, the synchronization of symbologies across multiple layers of input data include service provider system 104 the ensuring a domain of ordinal values is a union of each domain of the plurality of layers. When a shared metric and symbology are detected by the service provider system 104, the service provider system 104 synchronizes the styling parameters of the output representations to ensure the domain of the ordinal values is the union of the domains of all layers. For example, if for a domain for a first layer is [100, 2000], and a domain for a second layer is [50, 1500] the symbology for both layers are adjusted to the domain [50, 2000] by the service provider system 104. The service provider system 104 can also ensure that the properties of the symbology are identical (e.g. selecting the same color-ramp).

In addition to generating a union of domains, the service provider system 104 can also apply a top-down masking operation on lower layers of the plurality of layers. This can include, in some embodiments, using the styling parameters of the layer that has last been manipulated by the user. The service provider system 104 can use a top-down masking operation on lower layers, to hide underlying features. In some embodiments the service provider system 104 provides this hiding of features by masking or easing the symbology of a country in the world-layer in favor in favor of the more granular administrative subdivisions (e.g. Canada provinces, which are more granular than country boundaries, would mask the Canada country boundary data).

Figure 6:
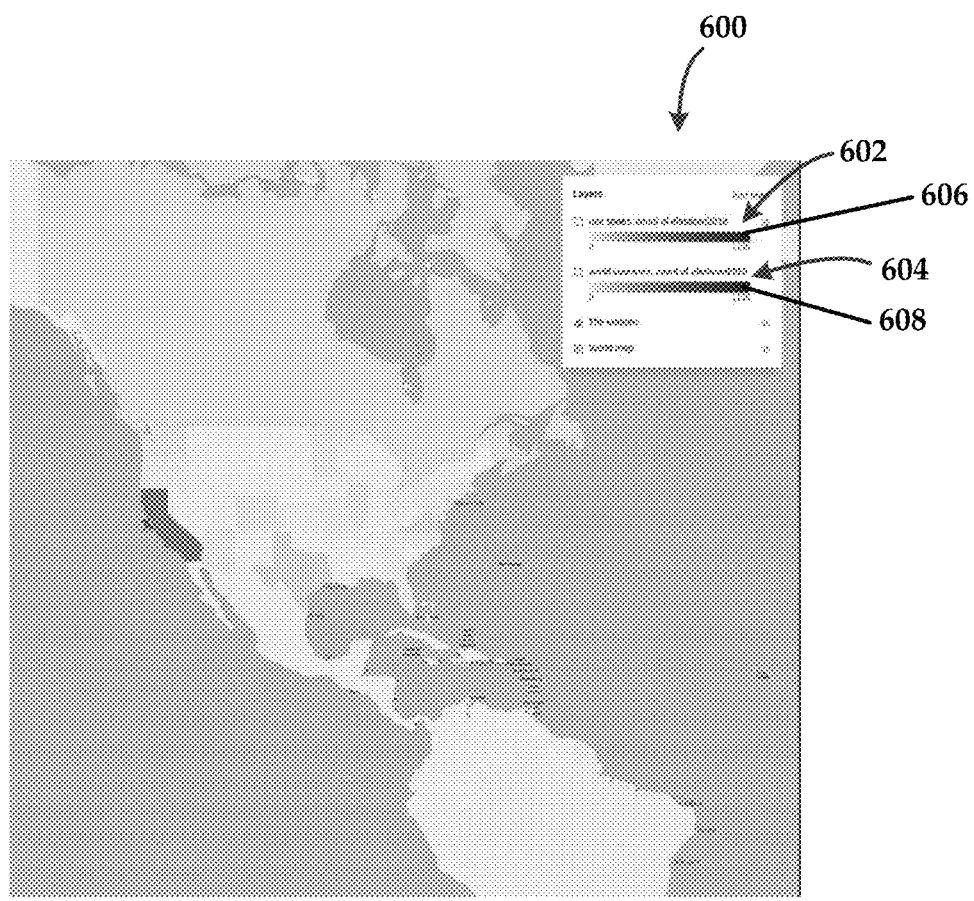
FIG. 6 is a graphical user interface that includes a map comprised of a plurality of layers.
Figure 7:
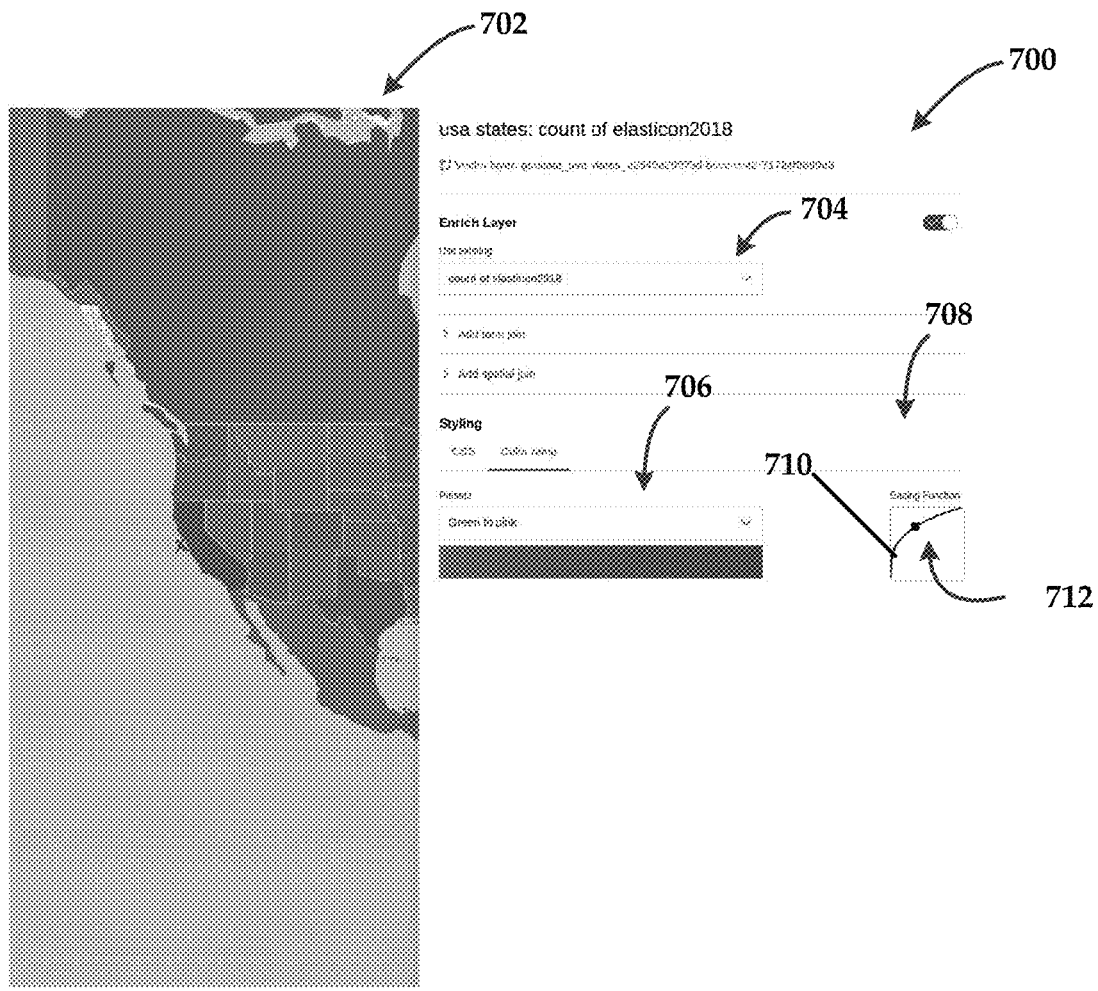
FIG. 7 is a graphical user interface that includes a map comprised of a plurality of layers, as well as an interface that can be used to select aspects of a parameterizable easing function used to change styling parameters on one layer, where the styling parameters are propagated to other layers automatically.

FIGS. 6 and 7 collectively illustrate this process of synchronization which includes domain unification and masking. In FIG. 6, a map 600 illustrates the United States with each state, each of which includes output representations. The state level layer 602 is presented along with a country level layer 604. The output representations of layer 602 are countries whereas the output representations of layer 604 are of states or provinces. Each of these output representations have symbology/styling parameters and in this example some of the input data for these output representations share a represent a common metric. In this example, the metric relates to a state and country for attendees of an event, such as Elasticon2018. For context, a shift in hue from light to dark indicates a greater volume of individuals.

In this example, the two layers are provided by two different sources (world countries, and US states) and are used to symbolize the same metric. The service provider system 104 automatically detects this correspondence in the metric and synchronizes the styling parameters for both layers 602 and 604 automatically.

In this example, the domain of both color ramps (606 and 608) is the union of values in both layers (0-1138 for both, 0-445 for USA states individually, and 0-1138 for the entire world layer). This allows users to visually compare individual USA states to countries.

According to some embodiments, the aspects disclosed above with regard to providing automatic scaling using parameterizable easing function can be combined with the synchronization process disclosed with respect to FIGS. 6 and 7. Thus, manipulation of styling parameters in one layer can result in automatic manipulation of the styling parameters of the other layer by the service provider system 104 to preserve the ability of the user to visually compare layers.

In FIG. 7, an interface 700 is presented along with a map 702, which includes a portion of the map 600. The user can manipulate any of the layers of the map 600 of FIG. 6. The user can select the desired layer from a dropdown menu 704. The interface 700 comprises a scaling preview 706 and X-Y chart 708 that includes an easing curve 710 and control icon 712. In general, as the user utilizes the interface 700 to manipulate styling parameters of output representations of one layer, corresponding styling parameter manipulations are performed on the other layer. A comparison between the map 600 of FIG. 6 and the map 702 of FIG. 7 illustrate styling parameters modification across layers.

Figure 8:
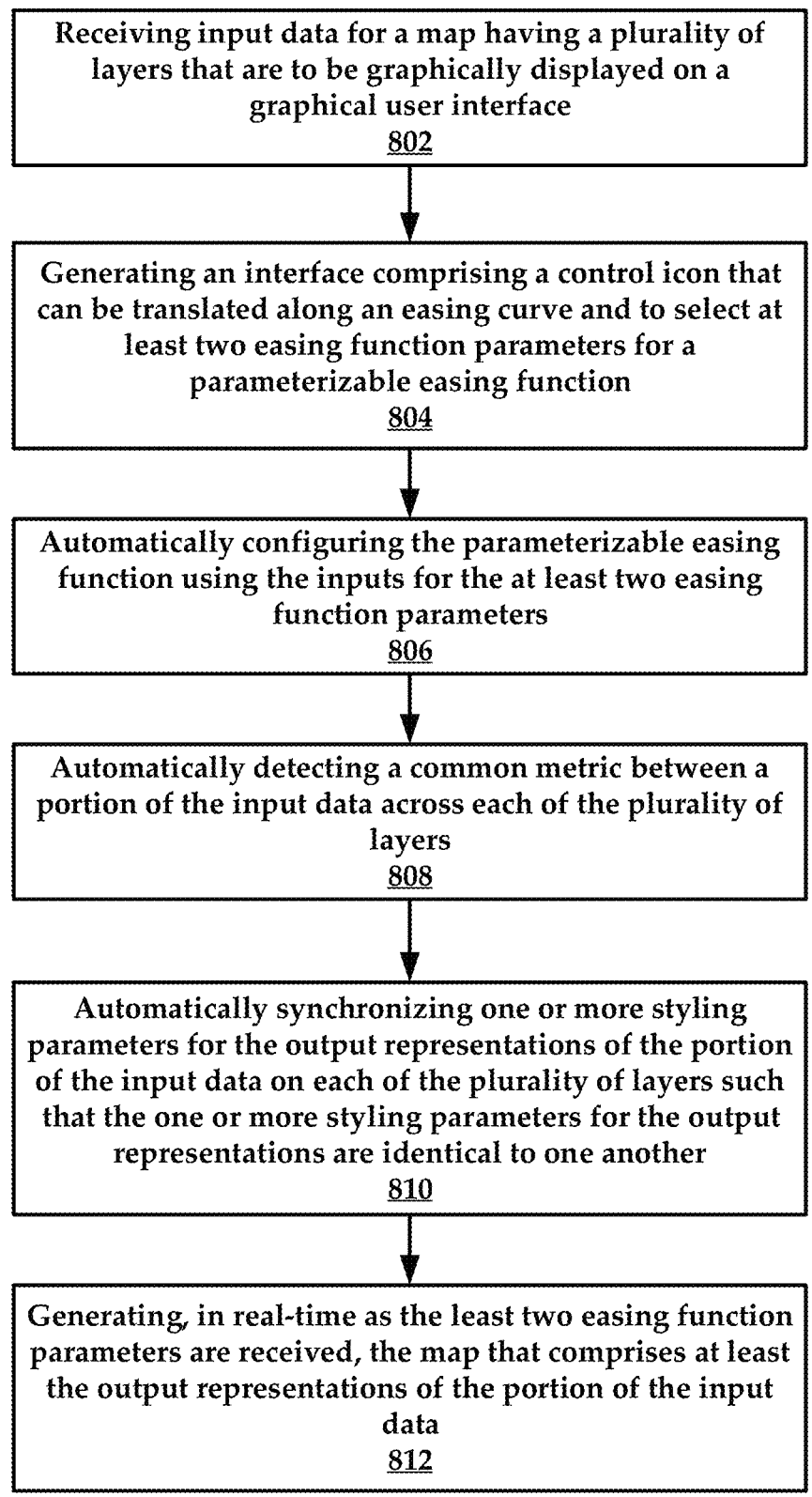
FIG. 8 is a flowchart of an example method of the present disclosure.

FIG. 8 is a flowchart of an example method of the present disclosure. The method includes a step 802 of receiving input data for a map having a plurality of layers that are to be graphically displayed on a graphical user interface. Next, the method includes a step 804 of generating an interface comprising an easing curve and a control icon that can be translated within a grid so as to define the easing curve to select at least two easing function parameters for a parameterizable easing function. In some embodiments, the method includes a step 806 of automatically configuring the parameterizable easing function using the inputs for the at least two easing function parameters, as well as a step 808 of automatically detecting a common metric between a portion of the input data across each of the plurality of layers.

According to some embodiments, the method includes a step 810 of automatically synchronizing one or more styling parameters for the output representations of the portion of the input data on each of the plurality of layers such that the one or more styling parameters for the output representations are identical to one another. In various embodiments, the method includes a step 812 of generating, in real-time as the least two easing function parameters are received, the map that comprises at least the output representations of the portion of the input data.

Figure 9:
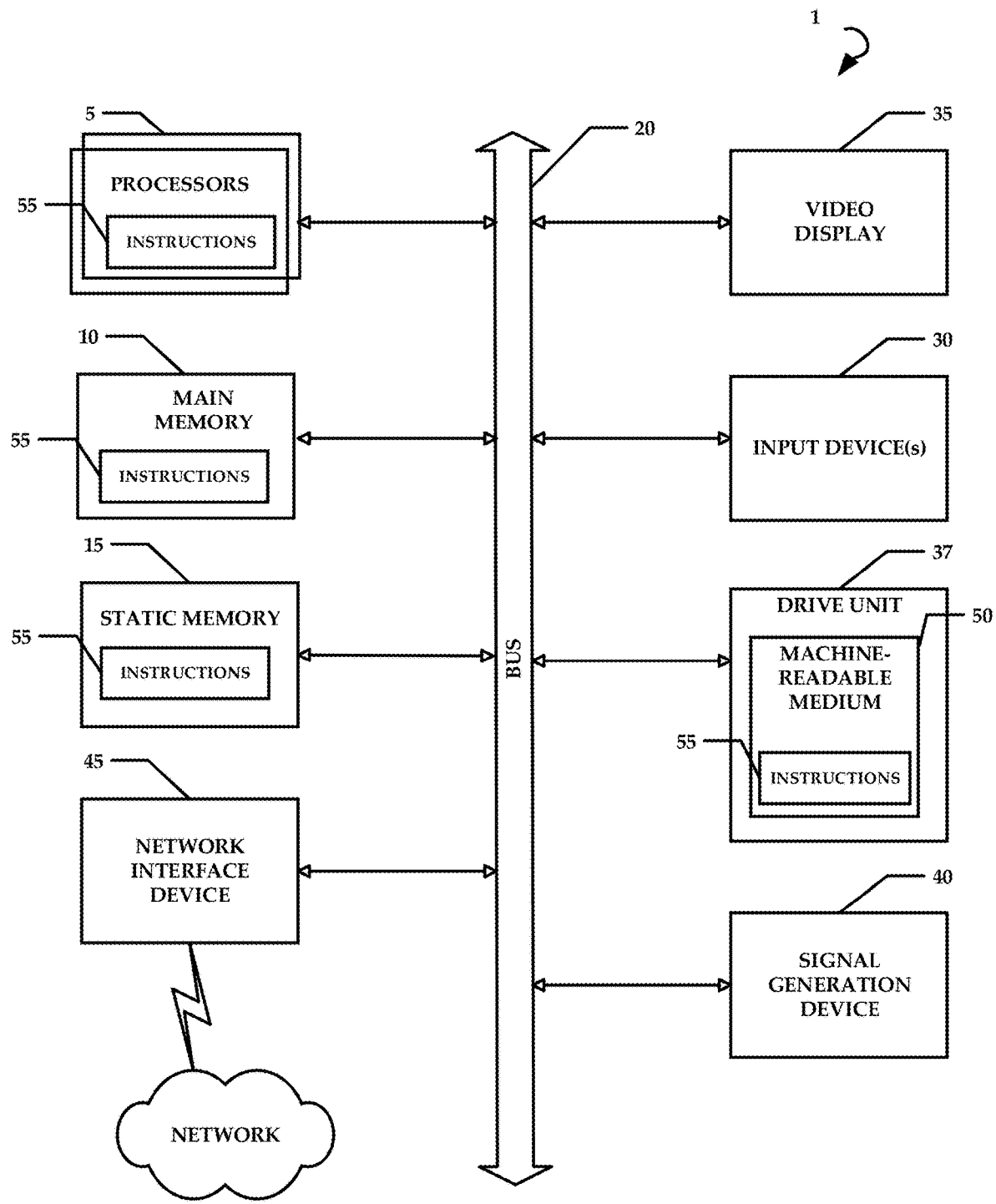
FIG. 9 is a schematic diagram of an example system for practicing aspects of the present disclosure.

FIG. 9 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
receiving input data to be graphically displayed on a graphical user interface;
generating an interface comprising a control icon that can be translated within a grid so as to define an easing curve and to select at least two easing function parameters for a parameterizable easing function; and
generating, in real-time as the at least two easing function parameters are received, the graphical user interface which comprises output representations of the input data which have one or more styling parameters that are selected based on the parameterizable easing function such that monotonicity is maintained between the input data and the output representations.

2. The method according to claim 1, further comprising automatically selecting an easing function type based on the input data for the at least two easing function parameters.

3. The method according to claim 2, wherein the easing function type comprises any of linear scaling, or approximations of log scaling and exponential scaling.

4. The method according to claim 3, wherein when the log scaling for the easing function type is selected, the easing curve is concave in shape and mutes outliers of the input data that are represented on a top-end of the easing curve.

5. The method according to claim 3, wherein when the exponential scaling for the easing function type is selected, the easing curve is convex in shape and mutes outliers of the input data that are represented on a low-end of the easing curve.

6. The method according to claim 1, further comprising selectively adjusting an appearance of a scaling preview based on a location of the control icon along the easing curve.

7. The method according to claim 6, wherein the graphical user interface comprises a map that is populated with the output representations.

8. The method according to claim 7, wherein the input data is received from a plurality of sources.

9. The method according to claim 7, wherein the map is comprised of a plurality of layers that each comprises parts of the input data, the method further comprises:
automatically detecting a common metric between the input data of the plurality of layers; and
automatically synchronizing the styling parameters for the output representations of the input data on each of the plurality of layers such that the styling parameters for the output representations are identical to one another.

10. The method according to claim 9, further comprising detecting a discrepancy between symbologies of the input data, wherein the styling parameters for the output representations of the input data are not automatically synchronized.

11. The method according to claim 9, wherein automatically synchronizing further comprises ensuring a domain of ordinal values is a union of each domain of the plurality of layers.

12. The method according to claim 11, wherein automatically synchronizing further comprises applying a top-down masking operation on lower layers of the plurality of layers.

13. A system, comprising:
a processor;
a memory, the processor executing instructions stored in the memory to:
receive input data to be graphically displayed on a graphical user interface;
generate an interface comprising a control icon that can be translated within a grid so as to define an easing curve and to select at least two easing function parameters for a parameterizable easing function; and
configure the parameterizable easing function using the input data for the at least two easing function parameters; and
a display device that provides, in real-time as the at least two easing function parameters are received, the graphical user interface which comprises output representations of the input data which have a visual appearance that is selected based on the parameterizable easing function such that monotonicity is maintained between the input data and the output representations, the visual appearance comprising at least one of hue or size.

14. A method, comprising:
receiving input data for a map having a plurality of layers that are to be graphically displayed on a graphical user interface;
generating an interface comprising a control icon that can be translated within a grid so as to define an easing curve and to select at least two easing function parameters for a parameterizable easing function;

automatically configuring the parameterizable easing function using the input data for the at least two easing function parameters;
automatically detecting a common metric between a portion of the input data across each of the plurality of layers;
automatically synchronizing one or more styling parameters for output representations of the portion of the input data on each of the plurality of layers such that the one or more styling parameters for the output representations are identical to one another; and
generating, in real-time as the least two easing function parameters are received, the map that comprises at least the output representations of the portion of the input data.

15. The method according to claim 14, further comprising detecting a discrepancy between symbologies of the input data, wherein the styling parameters for the output representations of the input data are not automatically synchronized, wherein automatically synchronizing further comprises ensuring a domain of ordinal values is a union of each domain of the plurality of layers.

16. The method according to claim 14, further automatically selecting an easing function type based on the input data for the at least two easing function parameters, wherein the easing function type comprises any of linear scaling or approximations of log scaling and exponential scaling.

17. The method according to claim 16, wherein when the log scaling for the easing function type is selected, the easing curve is concave in shape and mutes outliers of the input data that are represented on a top-end of the easing curve.

18. The method according to claim 16, wherein when the exponential scaling for the easing function type is selected, the easing curve is convex in shape and mutes outliers of the input data that are represented on a low-end of the easing curve.

19. The method according to claim 16, wherein the styling parameters are selected based on the parameterizable easing function such that monotonicity is maintained between the input data and the output representations.

* * * * *